United States Patent
Akagawa

[11] Patent Number: 5,994,699
[45] Date of Patent: Nov. 30, 1999

[54] THERMAL CAMERA FOR INFRARED IMAGING

[75] Inventor: Keiichi Akagawa, Kamakra, Japan

[73] Assignee: Nikon Corporation, Tokyo, Japan

[21] Appl. No.: 08/975,174

[22] Filed: Nov. 20, 1997

[30] Foreign Application Priority Data

Nov. 25, 1996 [JP] Japan ................................. 8-313506

[51] Int. Cl.⁶ ................................................. H01L 27/16
[52] U.S. Cl. ...................................... 250/332; 250/338.1
[58] Field of Search .................................. 250/332, 330, 250/334, 338.1, 339.02; 327/350

[56] References Cited

U.S. PATENT DOCUMENTS 4,409,483  10/1983  Turley ........................................ 250/332
4,712,010  12/1987  Alm .......................................... 250/332

*Primary Examiner*—Edward P. Westin
*Assistant Examiner*—Richard Hanig
*Attorney, Agent, or Firm*—Klarquist Sparkman Campbell Leigh & Whinston, LLP

[57] ABSTRACT

Thermographic infrared cameras are disclosed that comprise an infrared image sensor having linearly positioned thermosensing elements. A physical property of each thermosensing element changes in proportion to a corresponding temperature change caused by infrared irradiation incident on the thermosensing element. The infrared image sensor comprises a read device that reads signals from each thermosensing element in an ordered manner. A logarithmic converter receives signals from the infrared image sensor and outputs corresponding logarithmic values of the signals. An image information output device receives the logarithmic values from the logarithmic converter and outputs a corresponding infrared image. Such thermographic infrared cameras can further comprise a reference infrared image sensor. The reference infrared image sensor includes reference thermosensing elements each having a physical property that exhibits a change in value in proportion to a temperature change of the respective thermosensing element. A compensating logarithmic converter outputs a logarithmic value of the ratio of the signal read by the infrared sensor and the signal read by the reference infrared sensor. An image information output device receives the logarithmic values output by the compensating logarithmic converter and outputs corresponding infrared image information.

20 Claims, 8 Drawing Sheets

THERMAL CAMERA FOR INFRARED IMAGING

FIELD OF THE INVENTION

The present invention concerns thermographic infrared cameras and, more particularly, concerns thermographic infrared cameras that convert output signals of infrared image sensors to corresponding logarithmic values.

BACKGROUND OF THE INVENTION

A thermographic infrared camera typically uses a thermographic infrared sensor to capture an infrared image. Localized changes in temperature caused by infrared irradiation are detected by the thermographic infrared sensor. The sensor detects localized changes in temperature through changes in a value of a physical property of the sensor, such as localized changes in electrical resistance, electromotive force, or electrical charge.

A conventional thermographic infrared sensor typically has an inferior sensor sensitivity compared to a quantum infrared sensor. However, in contrast to quantum infrared sensors, thermographic infrared sensors do not require a coolant supply (e.g., a supply of liquid nitrogen) for operation. Consequently, the size of an infrared camera comprising a thermographic infrared sensor can be reduced which is advantageous for the various current uses of infrared cameras, such as crime prevention cameras or emergency monitoring cameras.

Conventional thermographic infrared sensors include multiple thermosensing elements, such as bolometers, each exhibiting an electrical resistance that varies with a change in temperature caused by infrared irradiation. Utilizing recently developed microfabrication techniques, several hundred bolometers may be formed in an array on a single semiconductor substrate. An air gap is typically formed between the substrate and each bolometer to prevent heat dissipation from the bolometer to the substrate. Such air gaps improve the bolometers' absorption efficiency of infrared irradiation.

FIG. 8 shows a conventional thermographic infrared camera which comprises a photographic lens 51 positioned to transmit infrared irradiation. An infrared image sensor 52 is positioned to receive infrared irradiation from the photographic lens 51. The infrared image sensor 52 includes an array of bolometers and is enclosed within a vacuum container 54 together with a thermoelectric cooler (TE cooler) 53. The TE cooler 53, typically comprising a Peltier element, maintains a constant temperature inside the vacuum container 54 to prevent the bolometers from being affected by temperature changes in the surrounding environment.

As a bolometer's temperature changes, its electrical resistance also changes which changes the electrical current that can flow through the bolometer at a given voltage. A scanning circuit is provided in the infrared image sensor 52 to sequentially apply a bias voltage to each bolometer. The bias voltage is applied in synchrony with a start pulse and a clock pulse produced by a drive pulse generation circuit 56. The scanning circuit then detects the electrical current level of each bolometer.

In prior-art thermographic infrared cameras, the detected electrical current through each bolometer is converted to a corresponding voltage by a suitable current-voltage converter. The voltage is then converted to a corresponding digital signal by an analog-to-digital (A/D) converter 57. An offset correction circuit 58 corrects any offset based on offset data stored in an offset data random-access memory (RAM) 59. A gain correction circuit 60 is typically utilized to correct gain, based on correction data stored in a gain correction data read-only memory (ROM) 61. The signals corrected by both correction circuits 58, 60 are then converted to corresponding video signals by a digital-to-analog (D/A) converter 62 and a video signal generation circuit 63. The video signals are displayed as infrared images on a monitor 64.

Because the resistance of each bolometer changes in proportion to a change in temperature of the bolometer caused by infrared irradiation, the rate of change $K_t$ of the bolometer conductance per degree Celcius may be expressed by Equation (1) as follows:

$$K_t = (1/\Delta T)(\Delta G/G) \quad (1)$$

wherein G is the bolometer conductance, $\Delta T$ is the temperature change, and $\Delta G$ is the change in conductance G when the temperature varies by $\Delta T$.

Whenever a bias voltage $V_b$ is applied to the bolometer, a bias current output $I_b$ may be expressed by Equation (2) as follows:

$$I_b = G \cdot V_b \quad (2)$$

With a change in conductance $\Delta G$ (due to the localized absorption of infrared irradiation), the electrical current change $\Delta I$ exhibited by the bolometer may be expressed by Equation (3) as follows:

$$\Delta I = \Delta G \cdot V_b = K_t \cdot \Delta T \cdot G \cdot V_b \quad (3)$$

Whenever no infrared irradiation is incident on the bolometer, the output signal from the bolometer is regarded as "background output." In the absence of infrared irradiation, the conductance G of each bolometer can still vary (as shown in Equation (2)), and thus, the output $I_b$ can still vary. The variation in output $I_b$ in the absence of infrared irradiation is superimposed, as an offset, on the output $I_b$ in the presence of infrared irradiation and is termed fixed pattern noise (FPN).

As shown by Equation (3), variations in the rate of change $K_t$, temperature variations $\Delta T$, and conductance variations $\Delta G$ of each bolometer influence the change in electrical current $\Delta I$, i.e., the gain of each bolometer. In a prior-art thermographic infrared camera, these variations must be corrected by an offset correction circuit 58 and a gain correction circuit 60. More specifically, in a prior-art infrared camera, to correct gain it is necessary to first determine a gain correction coefficient. The gain correction coefficient is used to cause the temperature of a reference blackbody to vary. The resulting output of the affected infrared image sensor 52 is then read into a computer that calculates the corresponding gain correction coefficient for each bolometer in order to obtain a uniform output from all the bolometers.

In such prior-art cameras, in order to determine an accurate gain correction coefficient, the temperature of the TE cooler 53 must be maintained with utmost accuracy. Such exacting temperature control requirements result in relatively expensive and complex infrared cameras.

Additionally, in certain prior-art infrared cameras, in order to accurately detect localized temperature variations in the sensor due to infrared irradiation, any temperature variations that could be transmitted to the sensor from the external environment had to be eliminated. To address this problem a reference bolometer is included inside the infrared image sensor 52. Adverse effects of variations in the surrounding environmental temperature can be eliminated by minimizing the temperature difference between the bolometers in the array and the reference bolometer. However, as the environmental temperature increases (with a concomitant increase in the temperature of the bolometers in the array), the output level of each bolometer in the array fluctuates more due to a greater variation in the conductance of each element that occurs with increased temperature. Therefore, in prior-art infrared cameras, a constant temperature inside the vacuum container 54 must be maintained, adding to the cost and complexity of the camera.

SUMMARY OF THE INVENTION

In view of the shortcomings of the prior-art summarized above, an object of the present invention is to provide a thermographic infrared camera that does not require gain correction to provide high-sensitivity detection of infrared irradiation. Another object is to provide a thermographic infrared camera that does not require exacting temperature control of the immediate environment of the infrared image sensor. Another object is to provide such a camera that eliminates infrared image defects that would otherwise arise from variations in environmental temperature.

A first representative embodiment of a thermographic infrared camera of the present invention comprises an infrared image sensor having linearly positioned thermosensing elements each having a physical property that exhibits a change in value in proportion to a temperature change caused by infrared irradiation. The infrared image sensor comprises a read device that reads an electrical signal from each thermosensing element. A logarithmic converter converts the signals from the infrared image sensor into corresponding logarithmic values. An image information output device receives the logarithmic values from the logarithmic converter and outputs a corresponding infrared image.

A second representative embodiment of a thermographic infrared camera of the present invention includes the features of the first embodiment listed above and further comprises a reference infrared image sensor. The reference infrared image sensor includes one or more reference thermosensing elements each having a physical property that exhibits a change in value in proportion to a temperature change. The second embodiment further comprises a compensating logarithmic converter that outputs a logarithm of a ratio of the signal produced by the infrared sensor and the signal produced by the reference infrared sensor. Additionally, the second embodiment includes an image information output device that receives the logarithmic values output by the compensating logarithmic converter and outputs corresponding infrared image information.

The foregoing and other objects, features, and advantages of the invention will become more apparent from the following detailed description of preferred embodiments of the present invention which proceeds with reference to the accompanying drawings.

DETAILED DESCRIPTION OF THE INVENTION

Figure 1:
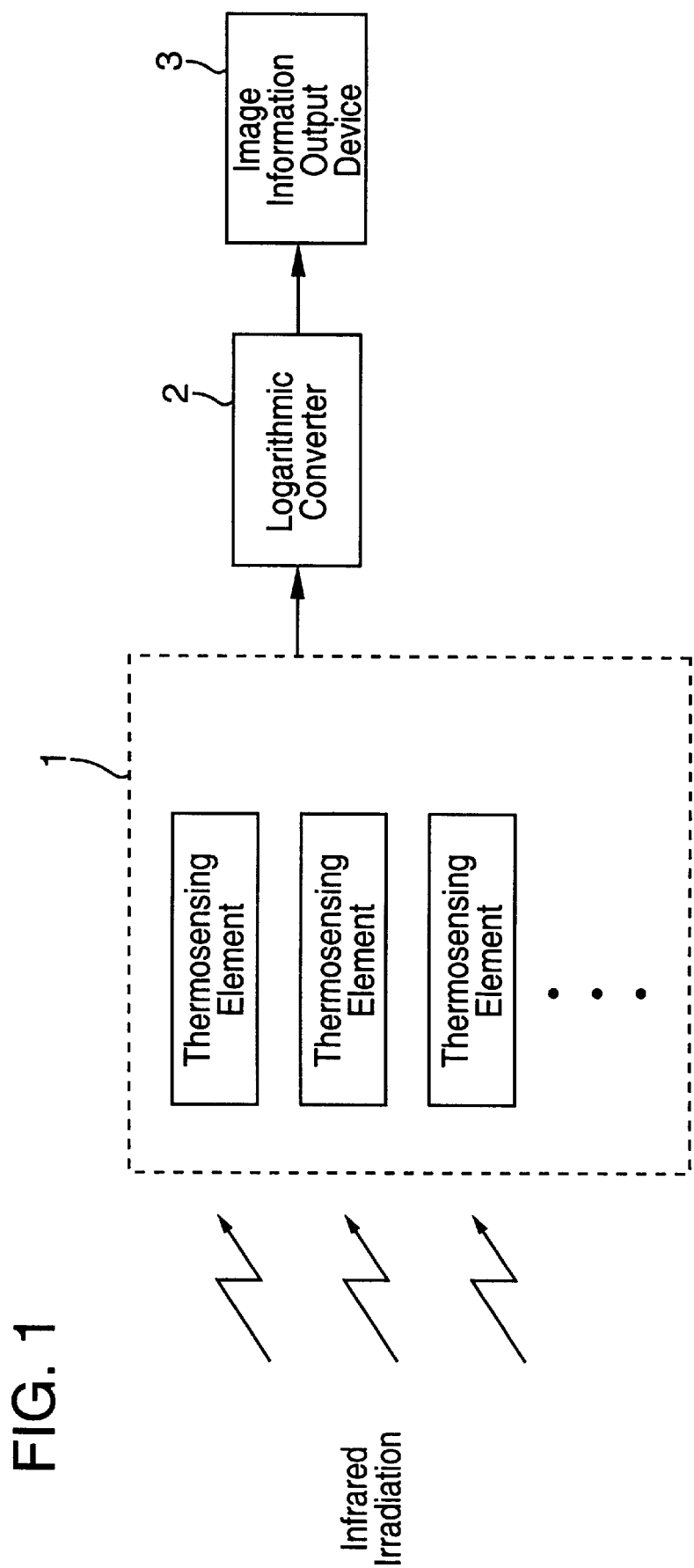
FIG. 1 is a block diagram illustrating certain general aspects of a first embodiment of a thermographic infrared camera of the present invention.

In general, as shown in FIG. 1, a first representative embodiment of the thermographic infrared camera of the present invention comprises an infrared image sensor 1 preferably comprising multiple thermosensing elements formed in an array. Each of the thermosensing elements has at least one physical property that exhibits a change in value in proportion to a temperature change caused by incident infrared irradiation on the element. The infrared sensor 1 produces an electrical signal corresponding to the value of the physical property of each thermosensing element. The infrared image sensor 1 comprises a "read" circuit (not shown) that reads the electrical signals from each thermosensing element. A logarithmic converter 2 receives the electrical signals from the infrared image sensor 1 and outputs corresponding logarithmic values of the electrical signals. An image information output device 3 receives the logarithmic values from the logarithmic converter 2 and outputs corresponding infrared image data.

Figure 3:
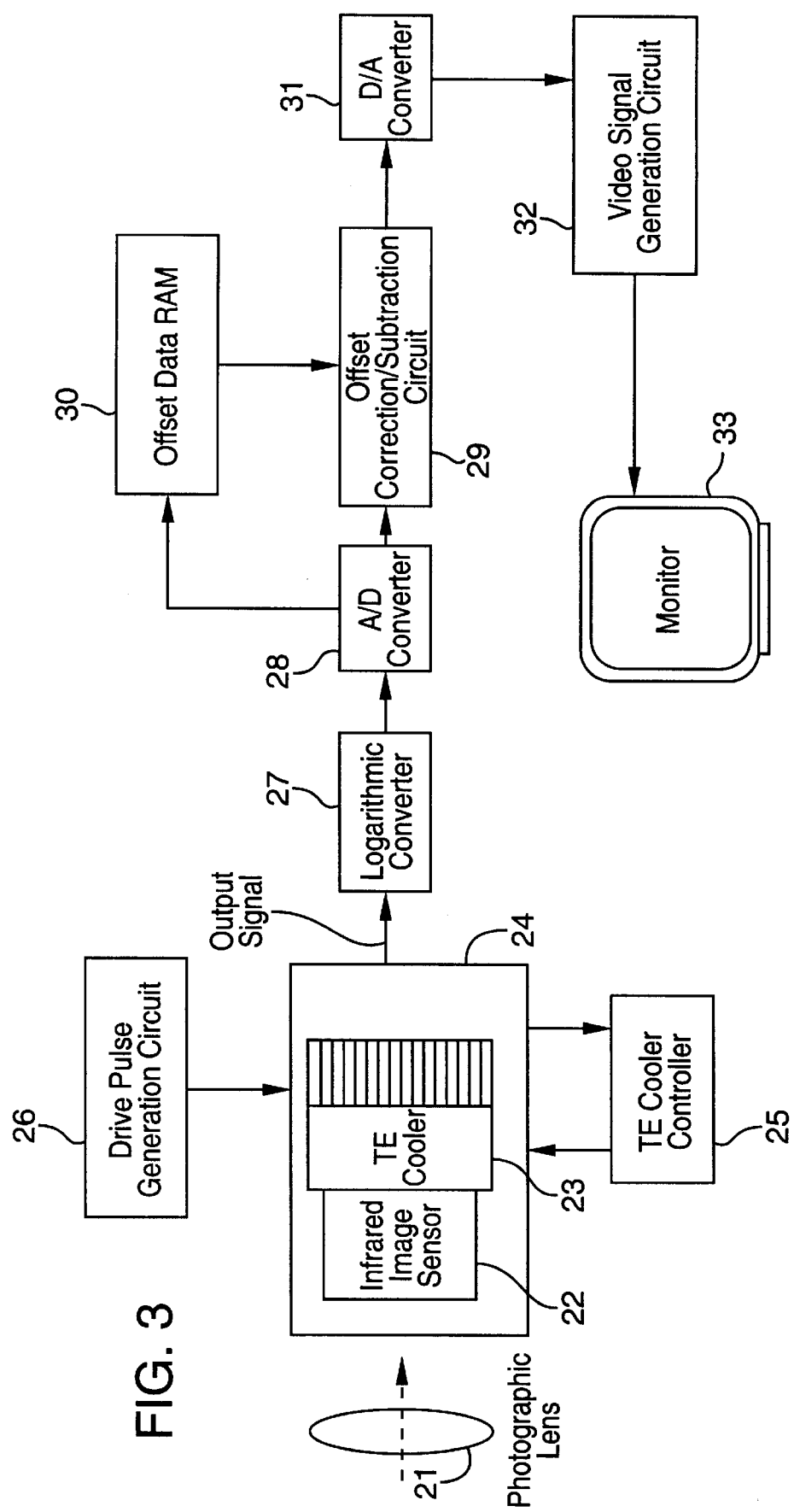
FIG. 3 is a block diagram showing details of the embodiment of the thermographic infrared camera shown in FIG. 1.

FIG. 3 illustrates details of the first embodiment of the thermographic infrared camera. Specifically, the first embodiment comprises a photographic lens 21 positioned to transmit infrared irradiation. An infrared image sensor 22 is positioned to receive the infrared irradiation transmitted by the photographic lens 21. The infrared image sensor 22 preferably comprises a plurality of thermosensing elements (preferably, the thermosensing elements comprise bolometers made of vanadium oxide, titanium oxide or other suitable material). The thermosensing elements are arranged in a suitable array (see FIG. 1).

The infrared image sensor 22 is housed within a vacuum container 24 together with a TE cooler 23. The TE cooler 23 is connected to a TE cooler controller 25. The output of a drive pulse generation circuit 26 is connected to a scanning circuit (not shown) positioned inside the infrared image sensor 22. A signal output of the infrared image sensor 22 is connected to a logarithmic converter 27. Preferably, the logarithmic converter 27 comprises an analog circuit that utilizes the non-linear current-voltage characteristics of a diode at a given temperature to convert the electrical signals from the infrared image sensor to corresponding logarithmic values of the signals (e.g., to generate an output voltage proportional to the logarithm of an input current). The logarithmic converter 27 outputs the logarithmic values to an A/D converter 28.

An output of the A/D converter 28 is connected to an offset correction/subtraction circuit 29 and input to an offset data RAM 30. Data recalled from the offset data RAM 30 are input to the offset correction/subtraction circuit 29. The output of the offset correction/subtraction circuit 29 is connected to a video signal generation circuit 32 via a D/A converter 31. An output of the video signal generation circuit 32 is connected to a display monitor 33.

With respect to FIGS. 1 and 3, the infrared sensor 1 of FIG. 1 corresponds to the infrared image sensor 22 and the drive pulse generation circuit 26 of FIG. 3; the logarithmic converter 2 of FIG. 1 corresponds to the logarithmic converter 27 and the A/D converter 28 of FIG. 3; and the image information output device 3 of FIG. 1 corresponds to the D/A converter 31 and the video signal generation circuit 32 of FIG. 3.

Figure 4:
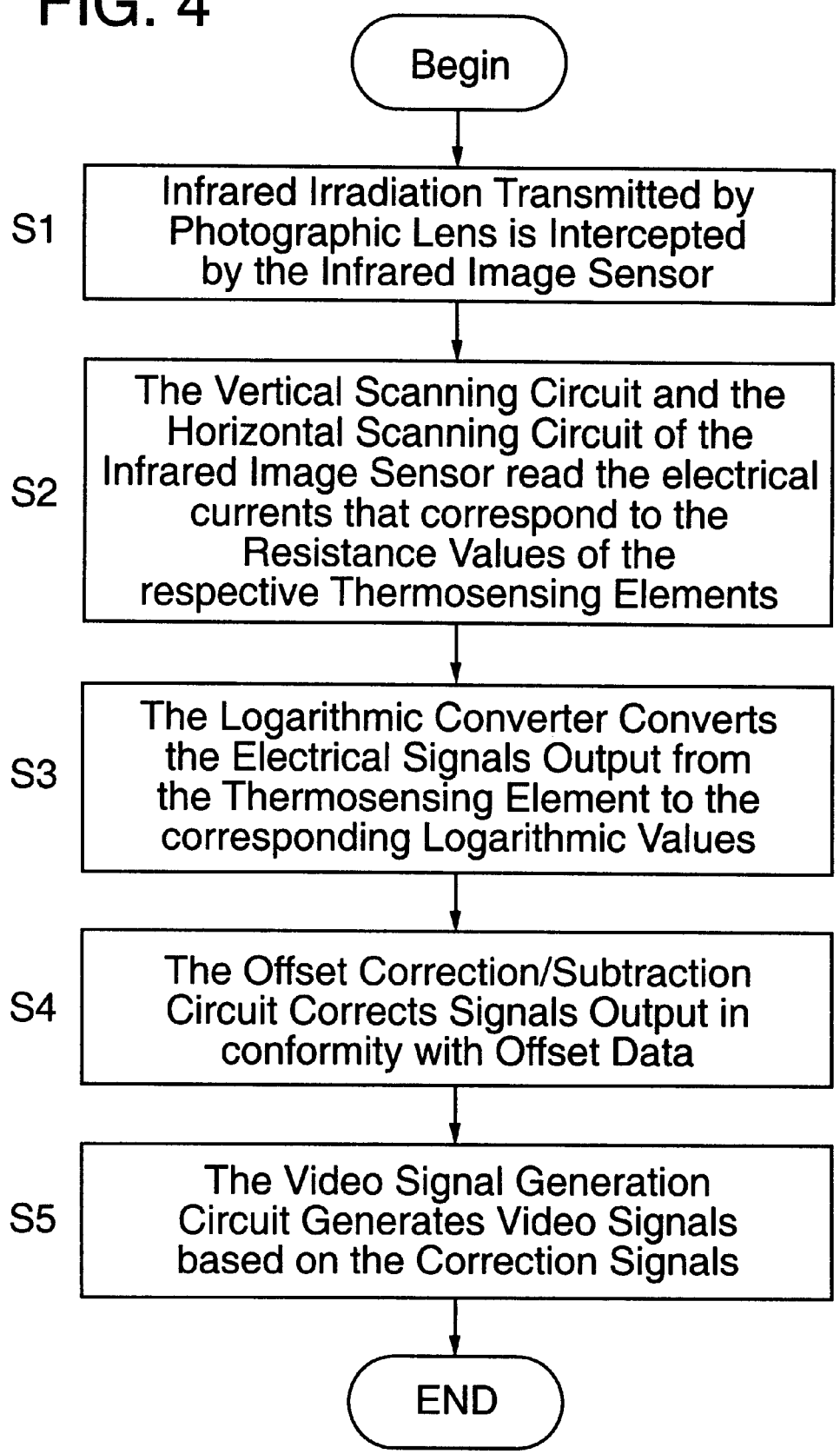
FIG. 4 is a flowchart describing aspects of the operation of the embodiment of the thermographic infrared camera shown in FIG. 1.

Operation of the first embodiment is described with reference to the flow chart shown in FIG. 4. Referring to FIG. 4, infrared irradiation is transmitted by the photographic lens 21 and is received by the infrared image sensor 22 (step S1). The electrical resistance of each thermosensing element of the infrared image sensor 22 changes as a function of the temperature of the respective element. To eliminate the effect of the surrounding environmental temperature on the resistance values of the thermosensing elements, the TE cooler 23 is utilized to maintain a constant temperature inside the vacuum container 24.

Electrical current signals corresponding to the resistance value of each thermosensing element are "read" from the infrared image sensor 22 at a speed that matches, for example, the frame rate of television (30 frames per second). A vertical scanning circuit (not shown) and a horizontal scanning circuit (not shown) are disposed inside the infrared image sensor 22 to sequentially read the signal produced by each thermosensing element. Each thermosensing element has a respective switch (not shown) connected thereto that controls whether or not the signal from the respective element is to be read or not read at a given instant. During readout, the respective switches are turned on and off in a coordinated manner by the scanning circuits.

More specifically, the vertical scanning circuit and the horizontal scanning circuit sequentially operate the thermosensing element switches via a start pulse and a clock pulse generated by the drive pulse generation circuit 26. A bias voltage from an external voltage source is sequentially applied to the respective thermosensing elements corresponding to the selectively operated switches. The electrical current signals flowing from the thermosensing elements are thus read (step S2, FIG. 4).

The electrical current signals next undergo logarithmic conversion in the logarithmic converter 27 and are then output as voltage signals to the A/D converter 28 (step S3, FIG. 4). The A/D converter 28 converts the analog voltage signals to corresponding digital signals. The offset correction/subtraction circuit 29 then corrects any offset in the respective digital signals by subtracting corresponding correction data stored in the offset data RAM 30 (step S4, FIG. 4).

Data can be written to the offset data RAM 30 whenever infrared irradiation is not being received by the infrared sensor elements. A masking shield (not shown), used to block infrared irradiation, is preferably positioned between the source of infrared irradiation and the photographic lens 21 of the camera. Whenever infrared irradiation is blocked by the masking shield, the output of the A/D converter 28 is routed to the offset data RAM 30. Afterward, the connection between the offset data RAM 30 and the A/D converter 28 can be disconnected.

The offset corrected digital signals are transmitted to the video signal generation circuit 32 via the D/A converter 31. The resulting analog signals are converted to respective video signals by the video signal generation circuit 32 (step S5). The monitor 33 then displays the resulting infrared image.

The output signal $A_b$ of the logarithmic converter 27 may be expressed by Equation (4) as follows:

$$A_b = \log(I_b) = \log(G \cdot V_b) \quad (4)$$

where $V_b$ is the bias voltage applied to the thermosensing element, $I_b$ is the output bias voltage, and G is the conductance of the thermosensing element. If there is a change $\Delta G$ in the conductance G of the thermosensing element due to absorption of infrared irradiation, the change $\Delta A$ of the output signal, after the signal is logarithmically converted, may be expressed by Equation (5) as follows:

$$\Delta A = \log(I_b + \Delta I) - \log(I_b) = \log(1 + \Delta I/I_b) = \log(1 + (K_t \cdot \Delta T \cdot G \cdot V_b)/(G \cdot V_b)) = \log(1 + K_t \cdot \Delta T) \quad (5)$$

Variations in $\Delta A$ are caused by variations between the rate of change $K_t$ and temperature change $\Delta T$, but have no effect on variations in the conductance G of the thermosensing element. Further, variations in the rate of change $K_t$ and changes in temperature $\Delta T$ are relatively small compared with the variations in the conductance G of the thermosensing elements. Thus, if an offset correction (Equation (4)) is carried out, the gain correction (Equation (5)) may be omitted.

Accordingly, by utilizing the logarithmic converter 27 in the thermographic infrared camera of the present invention, level fluctuations occurring due to variations in the conductance G of each thermosensing element can be controlled. As a result, offset correction, by itself, is sufficient and a gain correction/multiplication circuit is unnecessary. Furthermore, because a gain correction/multiplication circuit can be omitted, it is not necessary to determine a gain-correction coefficient, thereby facilitating a reduction in cost and complexity of the thermographic infrared camera.

Figure 2:
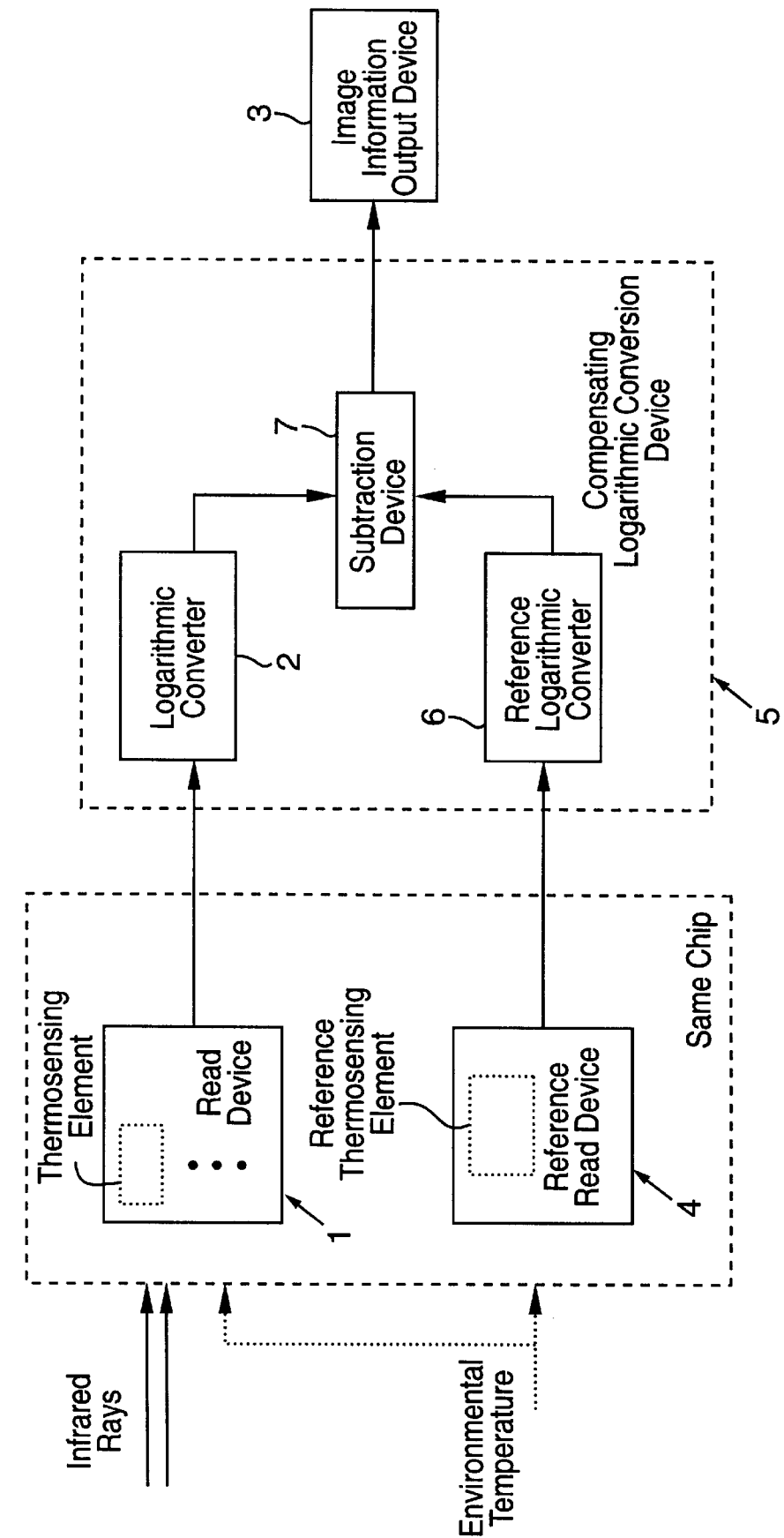
FIG. 2 is a block diagram illustrating certain general aspects of a second embodiment of a thermographic infrared camera of the present invention.

As shown generally in FIG. 2, a second representative embodiment of a thermographic infrared camera of the present invention comprises features of the first embodiment shown in FIG. 3 and further comprises a reference infrared image sensor 4. The reference infrared image sensor 4 preferably comprises a plurality of reference thermosensing elements each having a physical property that exhibits a change in value in proportion to a change in temperature. Preferably, the reference thermosensing elements are arranged in an array and have physical characteristics substantially identical to those of the thermosensing elements.

The embodiment shown in FIG. 2 also includes a compensating logarithmic converter 5 that outputs a logarithmic value corresponding to a ratio of the signal from the infrared sensor 1 signal and the signal from the reference infrared sensor 4. The compensating logarithmic converter 5 comprises a logarithm converter 2, a reference logarithmic converter 6, and a subtraction device 7. The logarithmic converter 2 is as described above with respect to the first embodiment. The reference logarithmic converter 6 receives signals from the reference infrared sensor 4 and converts those signals to corresponding logarithmic values of a parameter of the signals. The subtraction device 7 receives logarithmic values from both the logarithmic converter 2 and the reference logarithmic converter 6. The subtraction device 7 functions as a comparator; i.e., it outputs the difference between a logarithmic value produced by the logarithmic converter 2 and the corresponding logarithmic value produced by the reference logarithmic converter 6. An image information output device 3 receives the logarithmic difference signal output by the compensating logarithmic converter 5 and produces therefrom a corresponding infrared image signal that can be converted into an infrared video signal.

It is preferable that the thermosensing elements comprise bolometers having one or more physical properties (e.g., resistance, electromotive force, electrical charge) that change in value in proportion to a change in temperature. The reference thermosensing elements are preferably arranged on the same substrate upon which the thermosensing elements are formed.

Thus, the infrared sensor 1 produces electrical signals corresponding to the value status of a physical property of its constituent thermosensing elements as a function of temperature of the individual thermosensing elements as influenced by incident infrared irradiation on the thermosensing elements. In order to minimize any effect of the external environment on the image ultimately produced from signals produced by the infrared sensor 1, a similar physical property of the constituent thermosensing elements of the reference infrared sensor 2 changes in a similar manner with respect to a change in temperature. However, instead of exhibiting a change in the physical parameter in response to heating caused by incident infrared irradiation, the reference thermosensing elements exhibit a change of the physical parameter in proportion to a change in the temperature of the surrounding environment (i.e., a temperature change due to one or more factors other than incident infrared irradiation). The reference infrared sensor 4 produces electrical signals corresponding to the physical property values of the reference thermosensing elements.

The compensating logarithmic converter 5 greatly reduces the magnitude of changes in the output of the infrared sensor 1 that could otherwise arise from a change in the external environment having no relation to the amount of infrared irradiation incident on the thermosensing elements of the infrared sensor 1. I.e., a change in a physical property of the thermosensing elements due to an environmental temperature variation can be eliminated by determining the difference between a value of the physical property of the reference thermosensing elements and a value of the physical property of the respective thermosensing elements.

Figure 5:
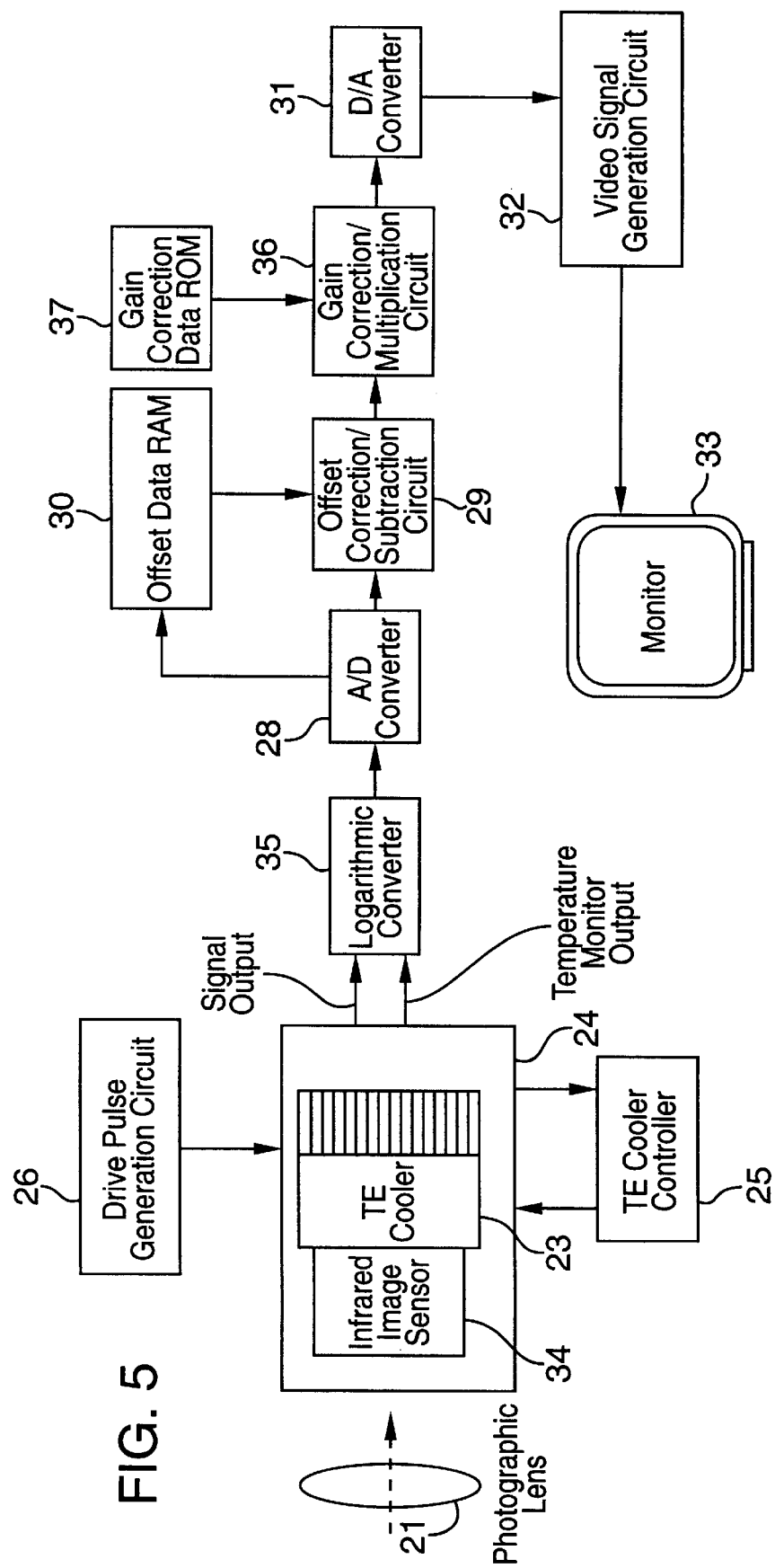
FIG. 5 is a block diagram showing details of the embodiment of the thermographic infrared camera shown in FIG. 2.

FIG. 5 illustrates, in detail, a thermographic infrared camera according to the second embodiment. Specifically, the second embodiment comprises a photographic lens 21 positioned to transmit infrared irradiation. An infrared image sensor 34 is positioned to receive infrared irradiation transmitted by the photographic lens 21. The infrared image sensor 34 preferably comprises a plurality of thermosensing elements (preferably, the thermosensing elements comprise bolometers made of palladium oxide, titanium oxide or other suitable material). The thermosensing elements are, preferably, arranged in an array formation (see FIG. 2). The second embodiment preferably includes a temperature monitor thermosensing element that produces an output (shown in FIG. 5 as "temperature monitor output") used to determine the environmental temperature (e.g., the temperature of the substrate). Preferably, the temperature monitor thermosensing element is situated on the same substrate as are the thermosensing elements and the reference thermosensing elements.

The temperature monitor thermosensing element preferably has a variable physical property that is substantially identical to the variable physical property of the infrared irradiation thermosensing elements that exhibit a change in response to a change in temperature of the individual thermosensing elements. Also, the temperature monitoring thermosensing element is preferably identical in shape to any of the infrared irradiation thermosensing elements. However, an air gap is preferably not formed between the temperature monitor thermosensing element and the substrate. Hence, even if the temperature monitor thermosensing element is exposed to infrared irradiation, the resistance value of the temperature monitor element is determined only by the external environmental (i.e., substrate) temperature, because heat due to incident infrared irradiation on the temperature monitor thermosensing element is dissipated into the substrate. Temperature variations of the infrared irradiation thermosensing elements caused by infrared irradiation may then be determined by obtaining the difference between the output of the infrared irradiation thermosensing elements (i.e., the signal output in FIG. 5) and the signal output by the temperature monitor thermosensing element (i.e., the temperature monitor output in FIG. 5).

Further with respect to FIG. 5, the infrared image sensor 34 is housed within a vacuum container 24 together with a TE cooler 23. The TE cooler 23 is connected to a TE cooler controller 25. The output of a drive pulse generation circuit 26 is input to a scanning circuit (not shown) inside the infrared image sensor 34. The signal output of the infrared image sensor 34 and the temperature monitor thermosensing element output are input to a logarithmic converter 35. Output signals from the logarithmic converter are routed to an A/D converter 28.

Signals output from the A/D converter 28 are connected to an offset correction/subtraction circuit 29 and to an offset data RAM 30. Data recalled from the output data RAM 30 are routed to the offset correction/subtraction circuit 29. An output of the offset correction/subtraction circuit 29 is, preferably, connected to a gain correction/multiplication circuit 36. Also input to the gain correction/multiplication circuit 36 are data recalled from a gain correction data ROM 37. An output of the gain correction/multiplication circuit 36 is connected to a video signal generation circuit 32 via a D/A converter 31. Video signals generated by the video signal generation circuit 32 in response to analog signals input thereto are output to a monitor 33.

Comparing FIGS. 2 and 5, the infrared sensor 1 of FIG. 2 corresponds to the infrared image sensor 34, the scanning circuit, and the drive pulse generation circuit 26 of FIG. 5; the image information output device 3 of FIG. 2 corresponds to the D/A converter 31 and the video signal generation circuit 32 of FIG. 5; the reference infrared image sensor 4 of FIG. 2 corresponds to the temperature monitor thermosensing element ("temperature monitor output") of FIG. 5; and the compensating logarithmic converter 5 of FIG. 2 corresponds to the logarithmic converter 35 and the A/D converter 28 of FIG. 5.

Operation of the second embodiment of the present invention is described with reference to the flow chart shown in FIG. 6. Infrared irradiation is transmitted by the photographic lens 21 and is received by the infrared image sensor 34 (step S1). The electrical resistance of each thermosensing element of the infrared image sensor 34 changes as the temperature of the respective elements changes. Because changes in the surrounding environmental temperature can change the electrical resistance of the thermosensing elements extraneously of any resistance change attributable to incident infrared irradiation, the TE cooler 23 is utilized to maintain a constant temperature inside the vacuum container 24.

Electrical current signals individually corresponding to the respective resistance values of individual thermosensing elements are "read" from the infrared image sensor 34. A vertical scanning circuit (not shown) and a horizontal scanning circuit (not shown) are disposed inside the infrared image sensor 34 to sequentially read the electrical current signals produced by each thermosensing element. Each thermosensing element is connected to a respective switch (not shown) that controls whether or not the signal from the respective element is to be read or not read at a given instant. During readout, the respective switches are turned on and off in a coordinated manner by the scanning circuits.

More specifically, the vertical scanning circuit and the horizontal scanning circuit sequentially operate the switches via a start pulse and a clock pulse generated by the drive pulse generation circuit 26 (FIG. 5). A bias voltage from an external voltage source is sequentially applied to the respective thermosensing elements corresponding to the selectively operated switches. The electrical current signals flowing from the thermosensing elements are thus read (step S2, FIG. 6).

The electrical current signal from the infrared image sensor 34 and the electrical current signal from the temperature monitor (serving as a reference current) are input to the logarithmic converter 35. The logarithmic converter 35 normalizes each incoming electrical current value to the electrical current value produced by the temperature monitor. The normalized electrical current values are converted by the logarithmic converter 35 into corresponding logarithmic voltage values. These conversions are preferably performed such that the dynamic range of the infrared image sensor 34 and the input range of the A/D converter 28 coincide. The logarithmic voltage signals output from the logarithmic converter 35 are converted to corresponding digital signals by the A/D converter 28.

Figure 6:
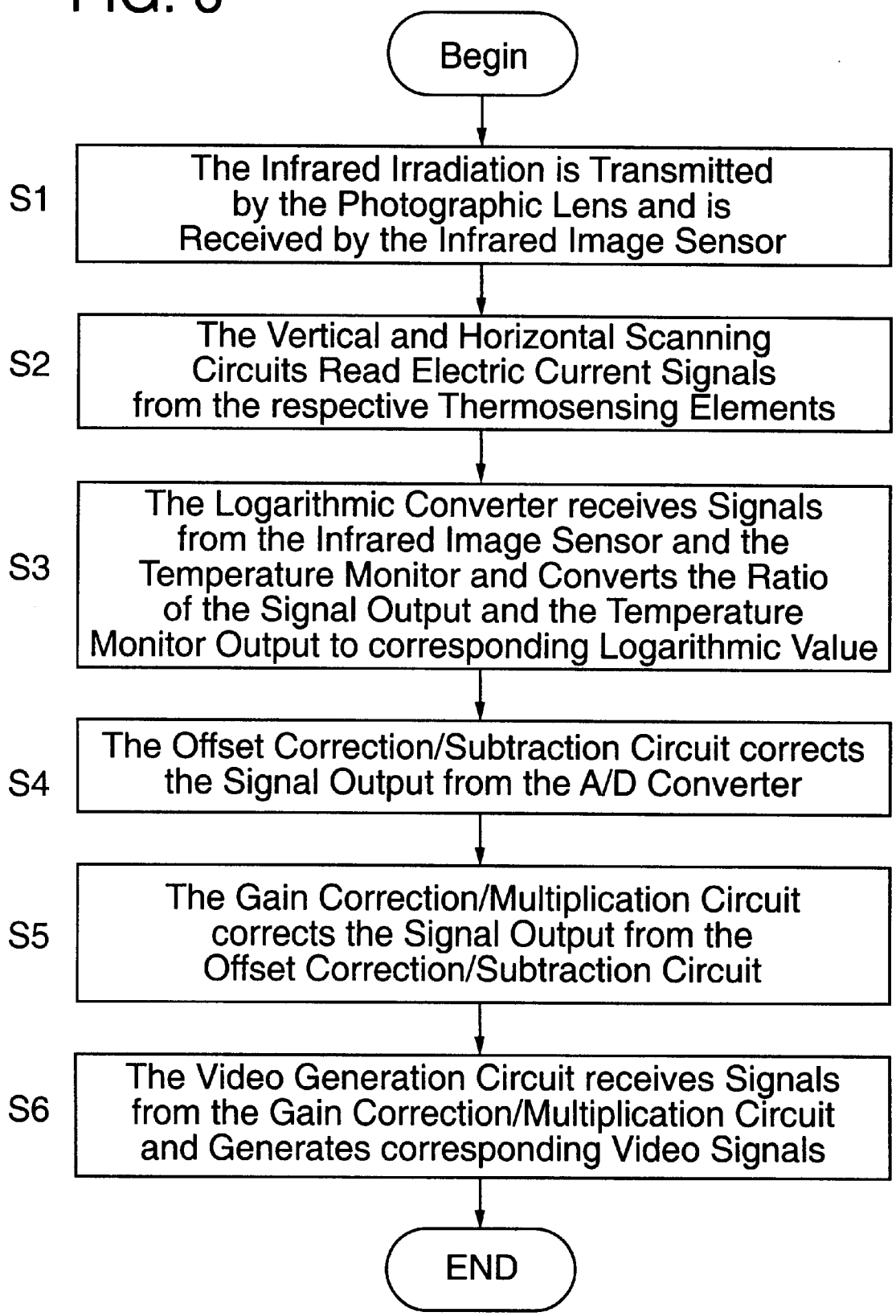
FIG. 6 is a flowchart describing the aspects of operation of the embodiment of the thermographic infrared camera shown in FIG. 2.

The offset correction/subtraction circuit 29 corrects any offset in the digital signals by subtracting pertinent correction data, stored in the offset data RAM 30, from the digital signals received from the A/D converter 28 (step S4, FIG. 6).

Gain in the digital signals is corrected as required by the gain correction/multiplication circuit 36 in conformity with gain-correction data stored in the gain correction data ROM 37 (step S5, FIG. 6). The corrected digital signals are then routed to the D/A converter 31 for conversion into corresponding analog signals. The analog signals are converted into corresponding video signals by the video signal generation circuit 32 (step S6, FIG. 6). The monitor 33 displays the corresponding infrared image.

The signals output from the logarithmic converter 35 may be described using the following equations.

The output $H_b$ of the logarithmic converter 35 may be expressed by Equation (6) as follows:

$$H_b = \log((G \cdot V_b)/(G_m \cdot V_b)) = \log(G/G_m) \qquad (6)$$

where G is the conductance of the thermosensing elements, $G_m$ is the conductance of the temperature monitor thermosensing element, and $V_b$ is the bias voltage. If there is a change $\Delta G$ in the conductance G, due to absorption of infrared irradiation, the change $\Delta H$ of the signal output by the logarithmic converter 35 may be expressed by Equation (7) as follows:

$$\Delta H = \log((G + \Delta G/G_m)/(G/G_m)) = \log(1 + \Delta G/G) = \log(1 + K_i \cdot \Delta T) \qquad (7)$$

The advantages of the infrared image camera of the present invention may be further described using numerical values. For example, assume a resistance value R of a thermosensing element, as in Equation (8):

$$R = R_0 (1 + \beta \Delta T) \qquad (8)$$

where $R_0$ is the resistance value at a temperature of 25° C., $\beta$ is the temperature coefficient of the resistance R (set at 2%), and $\Delta T$ is the temperature difference from 25° C.

Suppose the resistance value of sensor element #1 is 9.70 kΩ, of sensor element #2 is 10.3 kΩ, and the resistance value of the temperature monitor element is 10.0 kΩ at a temperature of about 25° C., and the temperatures of sensor element #1 and sensor element #2 rise 0.5° C. due to exposure to infrared irradiation. Using Equation (8), the resistance values R (Ω) of sensor element #1, sensor element #2, and the temperature monitor element, at various temperature levels, are shown in Table 1.

TABLE 1

| Element | Resistance* at | | | |
|---|---|---|---|---|
| | 25.0° C. | 25.5° C. | 30.0° C. | 30.5° C. |
| Sensor Element #1 | 9.7 | 9.797 | 10.67 | 10.76 |
| Temperature Monitor Element | 10 | 10.1 | 11 | 11.1 |
| Sensor Element #2 | 10.3 | 10.403 | 11.33 | 11.433 |

*All Resistance values are in units of kΩ

Based on Table 1, a comparison may be made using definite numeric values for cases in which a logarithmic conversion is, and is not, carried out. The output $V_{out}$ of each element can be determined using Equation (9), the resistance values R, the offset correction value $O_f$, and the gain correction value $G_a$.

$$V_{out} = G_a \cdot (R - O_f) \qquad (9)$$

Preferably, a range is stipulated such that the output $V_{out}$ is equal to 0 V when the temperature is 25° C. and is equal to 1 V when the temperature is 25.5° C. Using the resistance values from Table 1, the offset correction value $O_f$ (Ω) and the gain correction value $G_a$ for each sensor may be obtained using Equation (9), and are as follows:

TABLE 2

| Element | Offset Correction Value* $O_f$ | Gain Correction Value $G_a$ |
|---|---|---|
| Sensor element #1 | 9.7 | 0.0103092784 |
| Sensor element #2 | 10.3 | 0.009708738 |

*Offset Correction Values $O_f$ in units of kΩ

When the environmental temperature changes from 25° C. to 30° C., the offset of the temperature monitor element will increase by 1 kΩ. Therefore, if the value of the offset correction value $O_f$ increases by 1 kΩ, variations due to the environmental temperature may be canceled. Thus, the offset correction values $O^f$ of sensor element #1 and sensor element #2 increase every 1 kΩ. The offset correction $O_f'$ and the gain correction $G_a$ are shown in Table 3.

TABLE 3

| Element | Offset Correction Value* $O_f'$ | Gain Correction Value $G_a$ |
|---|---|---|
| Sensor element #1 | 10.7 | 0.0103092784 |
| Sensor element #2 | 11.3 | 0.009708738 |

*Offset Correction Values $O_f$ in units of kΩ

Using the Offset Correction Values of Table 3, the output $V_{out}$ at 30° C. and 30.5° C. may be determined as $V_{out} = G_a \cdot (R - O_f')$. The results are shown in Table 4.

TABLE 4

| Element | Output* $V_{out}$ @ 30° C. | Output* $V_{out}$ @ 30.5° C. |
|---|---|---|
| Sensor element #1 | −0.309 | 0.0691 |
| Sensor element #2 | 0.291 | 1.291 |

*Values in volts (V)

Thus, as compared to the output $V_{out}$ at 20° C. and 20.5° C., the output level fluctuates approximately 30%.

The following calculations are made for a case in which logarithmic conversions are carried out, as in the embodiments of the present invention.

First, the logarithm L of the ratio of the resistance value of sensor element #1 and the resistance value of the temperature monitor element, and between sensor element #2 and the temperature monitor element, may be calculated using Equation (10), as follows. The results of such a calculation are shown in Table 5.

$$L = \log (R \text{ of the sensor element}/R \text{ of the temperature monitor element}) \quad (10)$$

wherein R is the resistance values of the elements. Equation (10) uses the resistance value R in place of the conductance G of Equation (6).

TABLE 5

| | Values | | | |
|---|---|---|---|---|
| Element | 25° C. | 25.5° C. | 30° C. | 30.5° C. |
| Sensor element #1 | −0.304592 | −0.0205089 | −0.0304592 | −0.0214094 |
| Sensor element #2 | 0.0295588 | 0.0395091 | 0.02955588 | 0.0386086 |

In order to make the output $V_{out}$ equal to 0 V at 25° C. and equal to 1 V at 25.5° C., the offset correction value $O_f L$ of logarithm L and the gain correction value $G_a L$ of logarithm L are obtained using Equation (11) and Table 5, as follows:

$$V_{out} = G_a L \cdot (L - O_f L) \quad (11)$$

Results using Equation (11) are shown in Table 6.

TABLE 6

| Element | Offset Correction Value of Logarithm L $O_f L$ | Gain Correction Value of Logarithm L $G_a L$ |
|---|---|---|
| Sensor element #1 | −0.00304592 | 100.4995 |
| Sensor element #2 | 0.0295588 | 100.4995 |

The outputs $V_{out}$ at 30° C. and 30.5° C. are calculated using values from Table 5, Table 6, and Equation (11) and are shown in Table 7.

TABLE 7

| Element | Output* $V_{out}$ @ 30.0° C. | Output* $V_{out}$ @ 30.5° C. |
|---|---|---|
| Sensor element #1 | 0 | 0.9095 |
| Sensor element #2 | 0 | 0.9095 |

*Output $V_{out}$ in volts (V)

As shown by the results in Table 7, when a logarithmic conversion is performed, no level fluctuations arise in the output $V_{out}$ at 30° C. Further, at 30.5° C., the level fluctuations in the output $V_{out}$ are improved to approximately 10%. Thus, in the thermographic infrared camera according to the second embodiment, the logarithmic value of the ratio of the signal output and the temperature monitor output is calculated by the logarithmic converter 35. Because the level of the output is "compressed" as a result of the output level at any instant being a logarithmic value, signal level fluctuations occurring due to variations in the conductance (or resistance) of each element can be more easily controlled because the variable range is smaller than if the output levels were not logarithmic values.

Furthermore, although fluctuations in the output $V_{out}$ grow larger due to variations in the conductance of each element, if there is an increased variation in the environmental temperature, the fluctuations in $V_{out}$ due to resulting variations in the conductance of each element are reduced. In other words, even with poor temperature control within the vacuum container, $V_{out}$ fluctuations do not occur. In concrete terms, in the prior-art thermographic infrared cameras, temperature control had to be carried to within ±0.001° C. In the camera of the present invention, however, the temperature control need only be approximately ±1° C.

Further, because Equation (7) is identical to Equation (5), even if gain correction is omitted (like in the first embodiment), there is no reduction in the sensitivity of the infrared image sensor.

Figure 7:
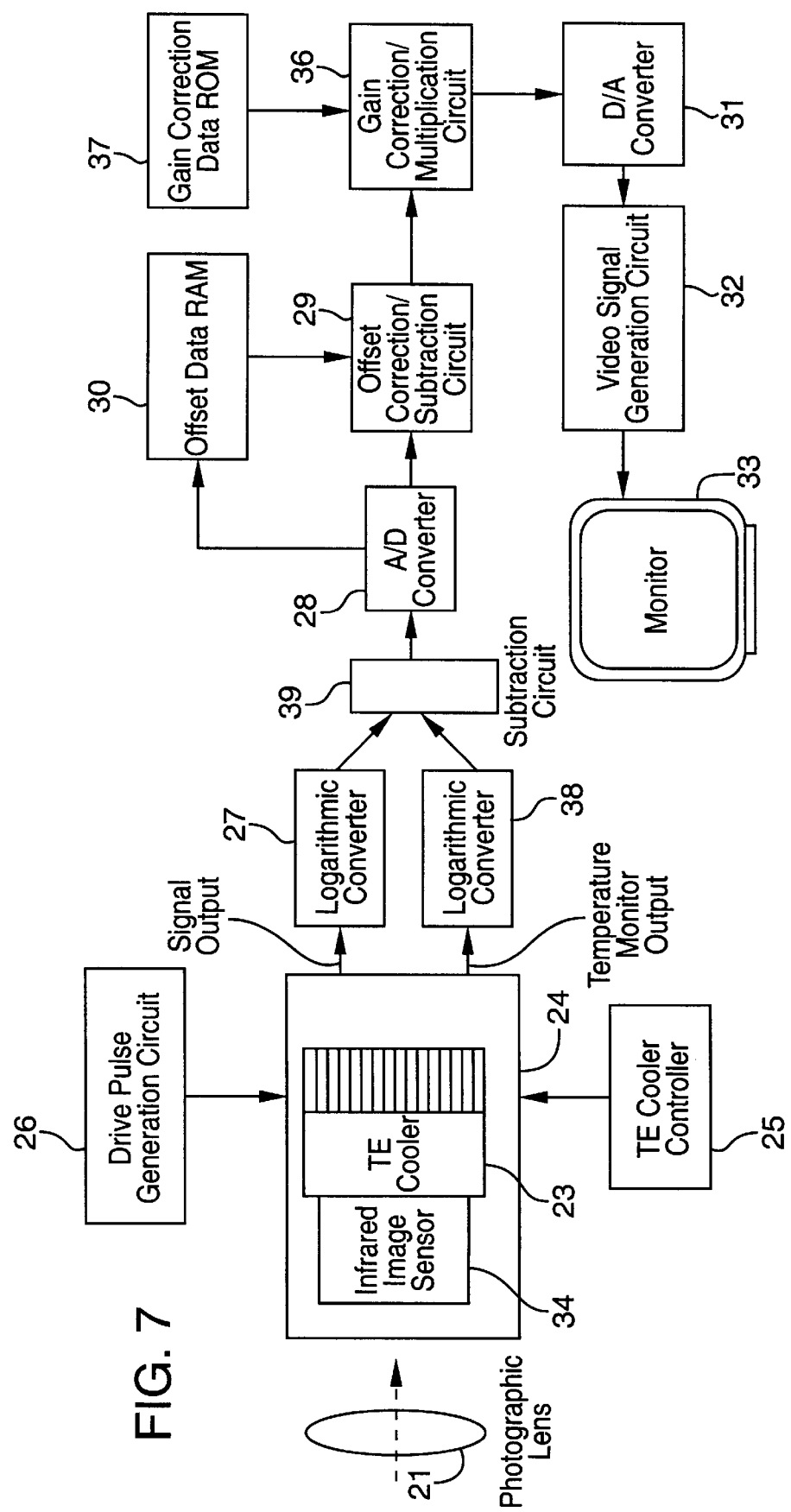
FIG. 7 is a block diagram showing details of a third embodiment of a thermographic infrared camera of the present invention.
Figure 8:
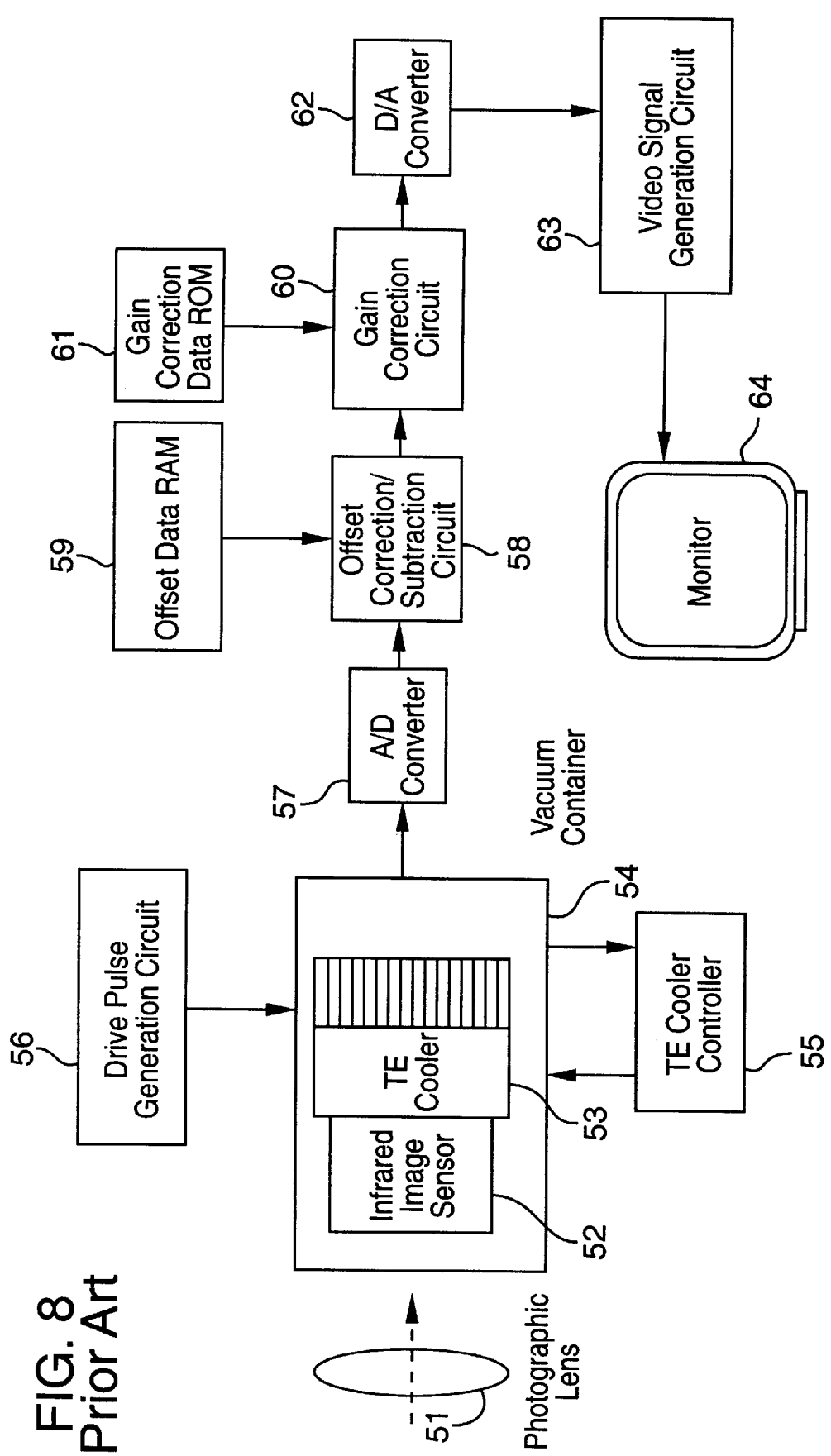
FIG. 8 is a block diagram showing a prior-art thermographic infrared camera.

Moreover, the second embodiment is not limited to a configuration where the logarithmic value of the ratio of the signal output and the temperature monitor output is output by the logarithmic converter 35. For example, as shown in FIG. 7, a first logarithmic converter 27 may convert the signal output to a logarithmic value, a second logarithmic converter 38 may convert the temperature monitor output to a logarithmic value, and a subtraction circuit 39 may then calculate the difference between the output of the first logarithmic converter 27 and the output of the second logarithmic converter 38.

Further, although determination of the logarithmic values are performed by an analog circuit in the above-described embodiments, conversion to corresponding logarithmic values can be performed using a limiter circuit. In addition, pyroelectric or thermal electromotive force sensors may be used as the thermosensing elements rather than bolometers. If bolometers are used for thermosensing elements, a diode that utilizes a Schottky junction can also be employed for each element. If a thermistor bolometer is utilized as a thermosensing element, although the output of the element changes as an exponential function with respect to a change in temperature, by carrying out a logarithmic conversion a suitable dynamic range can be found. Further, by connecting the camera of the present invention to an alarm device, the camera can be used as a fire alarm, a detection device, and similar apparatus.

In the first embodiment of a thermographic infrared camera according to the present invention, the logarithmic converter 2 performs a logarithmic conversion on a signal to "compress" the signal level. Therefore, fluctuations in the signal level caused by a corresponding change in a physical property of the respective thermosensing element can be reduced thereby making it possible to obtain a sufficient infrared image even if gain correction is not carried out. Namely, gain correction can be omitted while maintaining good infrared detection sensitivity, thereby providing a simpler and less expensive camera.

Furthermore, if an inverse logarithmic converter is provided to return a signal that underwent logarithmic conversion by the logarithmic converter to its original state, noise is reduced.

Additionally, as described above, a fluctuation in the signal level caused by a change in the value of a physical property of each thermosensing element, or caused by an increased variation in environmental temperature, are controlled in cameras according to the invention. Therefore, the temperature controller need not be as accurate as is necessary in conventional cameras. Even further, whenever variations in environmental temperature are relatively small, temperature control can be entirely omitted.

Whenever the reference thermosensing elements are arranged on the same substrate (e.g., semiconductor chip) as are the thermosensing elements, the temperature characteristics of the thermosensing elements can be made to coincide and a smaller device is provided.

Having illustrated and described the principles of the invention with reference to preferred embodiments, it should be apparent to those skilled in the art that the invention can be modified in arrangement and detail without departing from such principles. I claim all the modifications coming within the spirit and scope of the following claims.

I claim:

1. A thermographic infrared camera, comprising:
   (a) a thermal infrared sensor comprising a plurality of thermosensing elements each of which conducting an electrical current, each thermosensing element having a physical property that exhibits a change in value with a change in temperature caused by infrared irradiation on the respective thermosensing element, the thermal infrared sensor reading signals from each thermosensing element, each signal having a parameter that is proportional to the value of the physical property of the respective thermosensing element;
   (b) a logarithmic converter that receives the signals read by the thermal infrared sensor and outputs respective logarithmic values of the signals;
   (c) an offset correction circuit that receives the respective logarithmic values of the signals from the logarithmic converter and corrects offset in the respective logarithmic values of the signals when infrared irradiation is not being received by the thermosensing elements; and
   (d) an image information output device that receives offset corrected logarithmic values of the signals from the offset correction circuit and outputs corresponding infrared image information.

2. The thermographic infrared camera of claim 1, wherein the thermosensing elements are arranged in an array.

3. The thermographic infrared camera of claim 1, wherein electrical current levels that individually flow through the thermosensing elements vary with changes in temperature of the respective thermosensing elements caused by infrared irradiation incident on the respective thermosensing elements.

4. The thermographic infrared camera of claim 3, wherein at least one of the thermosensing elements comprises a bolometer.

5. The thermographic infrared camera of claim 3, wherein the logarithmic converter comprises an analog circuit.

6. The thermographic infrared camera of claim 5, further comprising an A/D converter that receives the logarithmic values from the logarithmic converter and converts the logarithmic values to corresponding digital signals.

7. The thermographic infrared camera of claim 1, further comprising an offset data memory device that receives the respective logarithmic values of the signals from the logarithmic converter and stores correction data for the respective logarithmic values of the signals whenever infrared irradiation is not being received by the thermosensing elements, wherein the offset correction circuit receives the logarithmic values of the signals from the offset data memory device and corrects offset in the signals using the correction data.

8. The thermographic infrared camera of claim 6, further including a reference thermal infrared sensor comprising a plurality of reference thermosensing elements each having a physical property that exhibits a change in value with a change in the surrounding environmental temperature, wherein the reference thermal infrared sensor reads reference signals from each reference thermosensing element, each reference signal having a parametric value that is proportional to the value of a physical property of the respective reference thermosensing element.

9. The thermographic infrared camera of claim 8, wherein the physical property of the reference thermosensing elements is substantially identical to the physical property of the thermosensing elements.

10. The thermographic infrared camera of claim 8, wherein the reference thermosensing elements and the thermosensing elements are situated on the same substrate.

11. The thermographic infrared camera of claim 8, further comprising a compensating logarithmic converter that outputs logarithmic signals, each logarithmic signal being a ratio of the signal read by the respective thermal infrared sensor and the signal read by the respective reference thermal infrared sensor.

12. The thermographic infrared camera of claim 8, wherein the image information output device receives the logarithmic signals from the compensating logarithmic converter and outputs infrared image information corresponding to the logarithmic signals.

13. The thermographic infrared camera of claim 12, wherein the compensating logarithmic converter comprises:
   a logarithmic converter that converts signals read by the thermal infrared sensor to corresponding logarithmic values of the signals;
   a reference logarithmic converter that converts signals read by the reference thermal infrared sensor to corresponding logarithmic values of the signals; and
   a subtraction device that outputs a difference between the logarithmic value produced by the logarithmic converter and the logarithmic value produced by the reference logarithmic converter.

14. A thermographic infrared camera, comprising:
   (a) a thermal infrared sensor comprising a plurality of thermosensing elements each of which conducting an electrical current, each thermosensing element having a physical property that exhibits a change in value with a corresponding change in temperature of the respective thermosensing element caused by infrared irradiation incident on the respective thermosensing element, the signals each having a parametric value that varies in proportion to a corresponding change in value of the physical property of the respective thermosensing element;
   (b) a reference infrared sensor comprising a plurality of reference thermosensing elements, each reference thermosensing element having a physical property that exhibits a change in value with a corresponding change in temperature, the reference infrared sensor reading reference signals from each reference thermosensing element, the reference signals each having a parametric value that varies in proportion to a corresponding change in the value of the physical property of the respective thermosensing elements;

(c) a compensating logarithmic converter that outputs logarithmic values of a ratio of respective signals read by the thermal infrared sensor and respective signals read by the reference infrared sensor;

(d) an offset correction circuit that receives the logarithmic values of the ratio of respective signals from the compensating logarithmic converter and corrects offset in the logarithmic values of the ratio of respective signals whenever infrared irradiation is not being received by the thermosensing elements; and (e) an image information output device that receives offset corrected logarithmic values of the ratio of respective signals from the offset correction circuit and outputs infrared image information corresponding to the offset corrected logarithmic values of the ratio of respective signals.

15. The thermographic infrared camera of claim 14, wherein the compensating logarithmic converter comprises:

a logarithmic converter that converts signals read by the thermal infrared sensor to corresponding logarithmic values of the signals;

a reference logarithmic converter that converts signals read by the reference infrared sensor to corresponding logarithmic values of the signals; and a subtraction device that outputs a difference between the logarithmic value converted by the logarithmic converter and the logarithmic value converted by the reference logarithmic converter.

16. The thermographic infrared camera of claim 14, wherein each reference thermosensing element has a variable physical characteristic that is substantially identical to the physical property of the thermosensing elements.

17. The thermographic infrared camera of claim 14, wherein the reference thermosensing elements and the thermosensing elements are situated on the same substrate.

18. The thermographic infrared camera of claim 14, wherein at least one of the thermosensing elements comprises a bolometer having an electrical resistance that changes in proportion to a corresponding change in the temperature of the bolometer.

19. The thermographic infrared camera of claim 18, wherein at least one of the reference thermosensing elements comprises a bolometer having an electrical resistance that changes in proportion to a corresponding change in the temperature of the bolometer.

20. The thermographic infrared camera of claim 14, further comprising an offset data memory device that receives the logarithmic values of the ratio of respective signals from the compensating logarithmic converter and stores correction data for the logarithmic values of the ratio of respective signals whenever infrared irradiation is not being received by the thermosensing elements, wherein the offset correction circuit receives the logarithmic values of the ratio of respective signals from the offset data memory device and corrects offset in the logarithmic values of the ratio of respective signals.

* * * * *

UNITED STATES PATENT AND TRADEMARK OFFICE
CERTIFICATE OF CORRECTION

PATENT NO. : 5,994,699

DATED : November 30, 1999

INVENTOR(S) : Keiichi Akagawa

It is certified that error appears in the above-identified patent and that said Letters Patent is hereby corrected as shown below:

Column 10, line 52, "O$^f$" should be --O$_f$--.

Signed and Sealed this

Twenty-second Day of May, 2001

Attest:

NICHOLAS P. GODICI

Attesting Officer    Acting Director of the United States Patent and Trademark Office